US005169433A

United States Patent [19]

Lindsay et al.

[11] Patent Number: 5,169,433

[45] Date of Patent: Dec. 8, 1992

[54] METHOD OF PREPARING MIXTURES OF ACTIVE INGREDIENTS AND EXCIPIENTS USING LIQUID CARBON DIOXIDE

[75] Inventors: Alexander D. Lindsay, East Brunswick; Barry A. Omilinsky, Princeton Junction, both of N.J.

[73] Assignee: Formulogics, Inc., Trenton, N.J.

[21] Appl. No.: 553,630

[22] Filed: Jul. 18, 1990

[51] Int. Cl.[5] ........ A01N 37/22

[52] U.S. Cl. ........ 71/118; 71/121; 71/114; 366/3; 514/89; 514/117; 514/263; 514/531

[58] Field of Search ........ 71/118, DIG. 1, 115; 366/3, 4, 5, 40, 348; 574/89, 117, 263, 531

[56] References Cited

U.S. PATENT DOCUMENTS

| | | | |
|---|---|---|---|
| H273 | 8/1987 | Melvin et al. | 149/109.6 |
| 3,547,620 | 12/1970 | Olin | 71/118 |
| 3,900,469 | 8/1975 | Cohen | 260/243 R |
| 4,546,612 | 9/1985 | Santhanam | 62/55 |
| 4,721,420 | 7/1988 | Santhanam et al. | 406/197 |
| 5,000,775 | 3/1991 | Grabiak et al. | 71/88 |

OTHER PUBLICATIONS

McRae et al. "Solubility of Hop $\alpha$- and $\beta$-acids in Liquid Carbon Dioxide", J. Inst. Brew. 86(6) pp. 296–298 (1980).

Bett et al. "Solubility of Pesticides in Liquid Carbon Dioxide", J. Inst. Brew. 86(6) p. 298 (1980).

*Primary Examiner*—Richard L. Raymond
*Assistant Examiner*—Brian M. Burn
*Attorney, Agent, or Firm*—Larson and Taylor

[57] ABSTRACT

Environmentally-acceptable intimate mixtures of active ingredients and excipients which meet economic performance levels are prepared without use of harmful solvents by solubilizing and mixing the components in liquid carbon dioxide maintained under pressure and then slowly reducing the pressure to convert the carbon dioxide to the gaseous phase and venting the gaseous carbon dioxide.

22 Claims, No Drawings

METHOD OF PREPARING MIXTURES OF ACTIVE INGREDIENTS AND EXCIPIENTS USING LIQUID CARBON DIOXIDE

BACKGROUND OF THE INVENTION

This invention relates to the preparation of formulations comprised of an intimate mixture of active ingredients and excipients. More particularly, the present invention relates to the preparation of such formulations without the use of toxic solvents.

In many commercial fields the final product offered to the consumer or to a processor contains the desired chemical ingredient (often called the active ingredient) diluted in solvents along with other excipients whose presence is required in order to yield the desired chemical or physical performance. This combination of active ingredients plus excipients has been created in order to permit the accurate delivery of the chemical, to enhance the activity of the active ingredient, or to put the active ingredient into a physical form which renders it useful to the customer. Examples of such finished goods are agricultural chemicals, pharmaceuticals, veterinary products, paints, dyes, aerosol sprays, polishes and the like.

When the active ingredient per se is too concentrated, insoluble, or difficult to handle by the consumer it is normally converted into some physical form which renders it useful to the consumer. The conversion may be effected for the commercial purchaser or the active ingredient may be delivered to a third party as an intermediate for additional processing. Thus, the consumer may be a commercial purchaser of the product or someone who purchases the item as the result of another process designed to produce either an end use product or another intermediate. It cannot be deemed that a significant amount of time and effort is spent converting active ingredients into useful physical forms by combining them with excipients. In all of these prior art conversion processes, the goal is to either maintain or enhance the economic usefulness of the active ingredient.

An example of such a prior art conversion process in the agricultural industry is the formulation of Atrazine. Atrazine is a water insoluble, solvent in soluble compound which, when applied to crops at the rate of 1 lb. of active ingredient per acre, controls a variety of economically harmful grasses. As synthesized, the product is a solid material that will not readily disperse in water (the carrier system typically used by farmers to apply crop chemicals). However, after mixing the active ingredient with suitable excipients, the resulting commercial formulation that is made available to the farmer readily disperses in water. In this form the active ingredient is of economic value to the grower. The value and need to prepare such formulations is equally evident in other areas of chemistry such as pharmaceuticals and veterinary products.

Heretofore, the process by which active ingredients are mixed with the necessary excipients have involved the use of volatile solvents, such as aromatic or aliphatic hydrocarbons, ketones, alcohols, etc. The public, however, is presently growing more concerned with the environment. Among the many concerns are the effects that the emission of solvents has on the public, on the quality of the atmosphere and on ground water. These concerns have prompted many to look for alternative methods by which these products may be formulated. For example, in recent years efforts have been made to reduce the use of chlorofluorohydrocarbons as solvents, propellants, and mold-blowing agents in various products. Also, the EPA has moved to reduce, if not eliminate, the presence of xylene in aromatic-based solvents used in the U.S. Attempts to remedy the problem by substituting another solvent that is environmentally more acceptable have not been satisfactory in that they have failed in most cases to provide the desired economic performance.

Other attempts to solve the problem involve converting the formulation to a physical form which requires no solvent. However, such a change often results in a product of reduced activity. The change in form may also be met with customer resistance or it may generate problems in the physical or chemical stability of the product when it is stored.

In order to insure good economic performance, these formulation systems frequently contain other excipients in addition to the solvent. These excipients may be surface active agents, antimicrobial agents, defoamers, anti-foamers, thickening agents, co-solvents or other chemicals considered important to the producer or end user to insure the economic performance of the active ingredient. Also, these excipients are selected to insure and/or to enhance product performance. This is true regardless of the end use of the product.

Regardless of the role of the excipient in the product, it must, during the formulation process, be brought into intimate contact with the active ingredient as well as the other excipients. In most cases this is accomplished by using the solvent powers of the selected solvent to dissolve the active ingredient. Sometimes this is achieved through the use of cosolvents. Thus, the effort to replace or reduce the use of a solvent will alter how an active ingredient is formulated. In addition, many preparations employ solvents at the same weight percentage as the active ingredient, often the combined weight percentage of excipient plus solvent exceeds that of the active ingredient. Given these levels of excipients in the product, the formulator must also design the product to account for proper performance of the excipients in the expected end use. Furthermore, since solvents often comprise the second largest constituent of a product, second only to the active ingredient on a percentage basis, the performance of the product is also influenced by the solvent. To insure the proper dispersion or emulsification of the oil phase, the chemist selects and adds certain surface active agents to the product to ensure economic performance. Therefore, any changes in the formulation process that eliminate use of solvents or reduce their content has a significant effect on the economic value of the active ingredient as well as the selection of excipients.

It is an object of the invention, therefore, to provide a method of eliminating or greatly reducing the use of harmful solvents in the preparation of formulations useful to the consumer or processor.

Another object of the invention is to provide a method which permits the intimate mixing of active ingredients and excipients on a molecular level usually achieved only when a solvent-based preparation is utilized.

Yet another object of the invention is to provide a solvent-free intimate mix of active ingredient and excipients that maintain the desired activity and stability.

A further object of the invention is to provide a method which produces an environmentally-acceptable final product which does not contain solvents and offers the same or a better level of economic performance as the same product which does contain solvents.

Yet another object is to provide an economical and environmentally-safe method for the production of chemical formulations.

A further object of the invention is to provide a method of formulating intimate mixtures of active ingredients and excipients heretofore impossible or impractical to prepare.

SUMMARY OF THE INVENTION

These and other objects of the invention are obtained by a method comprising solubilizing and mixing said active ingredient(s) and said excipient(s) in liquid carbon dioxide under a pressure sufficient to maintain said carbon dioxide in the liquid state, reducing said pressure to convert said carbon dioxide to the gaseous state and removing said gaseous carbon dioxide to provide a water-soluble or water-dispersible formulation comprising an intimate mixture of at least one active ingredient and at least one excipient.

It has been found that the use of liquid carbon dioxide as the solvent phase in chemical formulations comprised of intimate mixtures of active ingredients and excipients unexpectedly provides the aforementioned advantages. Unlike solvents which often require the introduction of heat to promote or hasten solubilization, liquid carbon dioxide exhibits broad solvent powers at room temperature.

Also, unlike conventional solvents heretofore employed in these formulations, liquid carbon dioxide is non-toxic. In addition, liquid carbon dioxide is a nonpollutant that offers the further advantages of nonflammability, low cost and ease of use.

DETAILED DESCRIPTION OF THE INVENTION

The method of the invention is conveniently carried out by placing the active ingredient or ingredients and excipients to be mixed in a pressure vessel capable of providing agitation while under pressure. Carbon dioxide is then added to the vessel and a liquid carbon dioxide phase is generated. Thus, the carbon dioxide can be placed in the vessel in the solid form and allowed to melt under controlled conditions or alternatively, it can be introduced as liquid carbon dioxide under the appropriate temperature and pressure. Once the carbon dioxide phase is present, the components are blended, under conditions of temperature and pressure that maintain the carbon dioxide in the liquid phase, until solution is complete. Normally, the mixing time will fall in the range of about 15 to 300 minutes, depending upon the particular components blended.

The operating conditions for maintaining the carbon dioxide in the liquid form are those which approach or exceed the supercritical fluid conditions of carbon dioxide (i.e., −20° to 37° C.). In general, operating conditions which range from about −55° to 60° C. at pressures of 600 to 4300 psi will maintain the carbon dioxide in the liquid phase. The preferred conditions are a temperature of 20° C. and a pressure of 700 to 900 psi.

Once dissolution of all the components has occurred, the pressure on the mixing vessel is slowly reduced, thereby allowing the carbon dioxide to escape under controlled conditions. Venting of carbon dioxide at rates of 0.01 to 5.0 ft./second can be used to achieve atmospheric conditions and at the same time control particle size.

With the removal of the carbon dioxide, the system returns to atmospheric pressure and room temperature. The resulting intimate mixture is water-soluble or water-dispersible and is removed from the mixing vessel and packaged. The actual physical state of the formulations packaged may be either solid or liquid depending principally upon the melting points of the active ingredient, the particular excipient employed and the proportions of active ingredient to excipient intended end use. If desired, the carbon dioxide withdrawn from the mixing vessel may then be filtered and recompressed for reuse.

Active Ingredients

The active ingredients of the invention can be any organic or inorganic chemical material or materials which are substantially soluble in liquid carbon dioxide under the conditions of temperature and pressure necessary to maintain the carbon dioxide in the liquid state. Illustrative of suitable active ingredients are pharmaceutical, pesticides, agricultural chemicals, veterinary products, paints, dyes and the like.

Excipients

The excipients blended with the active ingredients likewise are substantially soluble in liquid carbon dioxide and materials are either water-soluble or water-dispersible. Any one or more of the excipients commonly blended with the active ingredients to provide commercially useful products can be employed so long as they are substantially soluble in liquid carbon dioxide. Such excipients include components which enhance the activity, ease of use, application or administration of the active ingredient or otherwise improve its economic performance. Illustrative of such excipients are surface active agents, antimicrobial agents, thickening agents, defoamers, anti-foamers, co-solvents and the like.

The proportions of active ingredients to excipients may vary widely and optimum proportions are usually dependent upon the particular components blended. In general, the total active ingredients present in the mixture will fall in the range of about 0.1% to 95% by weight and the total excipients will fall in the range of about 99.9% to 5%. More commonly, the active ingredients will constitute about 40% to 85% by weight and the excipients about 60% to 15% by weight.

The final mixture, whether solid or liquid, can be packaged as is or can be dissolved or dispersed in water, depending on the intended end use. If aqueous solutions are prepared, the concentration of the blend in water will ordinarily fall in the range of about 5 to 90% by weight, more often about 40 to 60% by weight. Again, the specific concentration selected will depend on the use to which the final product is put.

Also, if desired, the final product prepared by the method can be subjected to additional processing. For instance, the resulting intimate mixture of active ingredients and excipients can be encapsulated or tabletted using any of the well-known encapsulating and tabletting techniques. Alternatively, the intimate mixtures can be formulated as part of propellant systems such as aerosol sprays, gels, emulsions, colloidal dispersion, sorptive carriers and the like.

The following examples are included to further illustrate the invention but are not to be considered as limiting in any respect.

EXAMPLE I

| | |
|---|---|
| Alachlor | 80 grams |
| Calcium dodecylbenzene sulfonate | 6 grams |
| nonylphenol ethylene oxide adduct 6 mole | 7 grams |
| nonylphenol ethylene oxide adduct 12 mole | 6 grams |
| nonylphenol ethylene oxide adduct 30 mole | 1 gram |

These are added to a 1-liter pressure vessel equipped with an agitator. The vessel is sealed and 200 ml of liquid carbon dioxide is pumped into the chamber. The pressure is adjusted to 1500 PSI and the temperature is maintained at 30° C. The agitator is activated and the mixture is blended for 30 minutes and then the carbon dioxide is slowly removed from the vessel. The carbon dioxide is passed through an activated carbon filter and then compressed for reuse. Once the pressure has been reduced to atmospheric pressure, the vessel is opened and the product having the above concentration is removed and packaged.

EXAMPLE II

| | % w/w |
|---|---|
| famphur | 75 |
| phosphate esters of nonylphenol | 25 |

These ingredients are added to a 1-liter pressure vessel equipped with an agitator and sampling tubes. The vessel is sealed and liquid carbon dioxide at 1500 psi is charged into the container. The agitator is activated and the mixture plus a 200 ml charge of carbon dioxide is allowed to stir. The temperature is maintained at 25° C. The mixture is blended for 30 minutes at which time the carbon dioxide is slowly removed from the vessel. The temperature is maintained at 25° C. during this interval. The recovered carbon dioxide is passed through a carbon filter and then is compressed for reuse. Once the pressure in the unit has been reduced to atmospheric pressure, the vessel is opened and the product is removed. The finished goods can be sterile filtered and blended with sterile water to generate an injectable preparation. The product as produced can also be diluted with water and poured over the backs of cattle to control grubs.

EXAMPLE III

| | % w/w |
|---|---|
| permethrin | 65 |
| alkyl napthalene sodium sulfate | 10 |
| block copolymers of ethylene oxide and propylene oxide | 8 |
| kraft lignin | 2 |
| fumed silica | 15 |

These ingredients are added to a 1-liter pressure vessel equipped with an agitator and sampling tubes. The vessel is sealed and liquid carbon dioxide at 1500 psi is charged into the container. The agitator is activated and the mixture plus 500 ml charge of carbon dioxide is allowed to stir. The temperature is maintained at 25° C. The mixture is blended for 30 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The finely divided powder can be placed into water and sold as a suspension concentrate, can be packaged in water soluble bags for dilution by the user, or can be used as is to treat surfaces of dwellings where termites might be located.

EXAMPLE IV

| | % w/w |
|---|---|
| trifluralin | 55 |
| ethylene glycol | 30 |
| block copolymer of ethylene oxide and propylene oxide | 5 |
| phosphate ester of polyoxyethylene nonylphenol | 10 |

These ingredients are added to a 1-liter pressure vessel equipped with an agitator and sampling tubes. The vessel is sealed an liquid carbon dioxide at 2500 psi is charged into the container. The agitator is activated and the mixture plus 600 ml charge of carbon dioxide is allowed to stir. The temperature is maintained at 40° C. The mixture is blended for 100 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The liquid preparation can be diluted by the user and sprayed onto the sod or crop.

EXAMPLE V

| | % w/w |
|---|---|
| dimenhydrinate | 72 |
| ethylene glycol | 20 |
| block copolymer of ethylene oxide and propylene oxide | 6 |
| nonylphenol polyethylene oxide (10 mole) | 2 |

These ingredients are added to a 1-liter pressure vessel equipped with an agitator and sampling tubes. The vessel is sealed and liquid carbon dioxide at 760 psi is charged into the container. The agitator is activated and the mixture plus 400 ml charge of carbon dioxide is allowed to stir. The temperature is maintained at 20° C. The mixture is blended for 300 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The material is then placed into a gauze patch for delivery through the skin by means of a dermal patch.

EXAMPLE VI

| | % w/w |
|---|---|
| dimenhydrinate | 55 |
| oxyethylate linear alcohol | 13 |
| microcrystalline cellulose | 25 |

-continued

| | % w/w |
|---|---|
| calcium stearate | 7 |

These ingredients are added to a 1-liter pressure vessel equipped with an agitator and sampling tubes. The vessel is sealed and liquid carbon dioxide at 1500 psi is charged into the container. The agitator is activated and the mixture plus 200 ml charge of carbon dioxide is allowed to stir. The temperature is maintained at 20° C. The mixture is blended for 30 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The product is then fed into a tablet press for the production of tablets for oral application of the product.

EXAMPLE VII

| | % w/w |
|---|---|
| dicamba | 46.75 |
| water | 20 |
| sodium hydroxide | 8.25 |
| nonylphenol ethylene oxide adduct 9-12 mole | 7 |
| fumed silica | 5 |

These ingredients are added to a 1-liter pressure vessel equipped with an agitator and sampling tubes. The vessel is sealed and liquid carbon dioxide at 3000 psi is charged into the container. The agitator is activated and the mixture plus 600 ml charge of carbon dioxide is allowed to stir. The temperature is maintained at 40° C. The mixture is blended for 180 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The solid product is then packaged in a water soluble bag which is then diluted in water by the user and applied to the crop or soil.

EXAMPLE VIII

| | % w/w |
|---|---|
| chlorpyrifos | 72 |
| nonylphenol ethylene oxide adduct 13 mole | 10 |
| nonylphenol ethylene oxide adduct 9 mole | 8 |
| synthetic calcium silicate | 10 |

These ingredients are added to a 1-liter pressure vessel equipped with an agitator and sampling tubes. The vessel is sealed and liquid carbon dioxide is charged into the container. The agitator is activated and the mixture plus 150 ml charge of carbon dioxide is allowed to stir. The temperature is maintained at 35° C. The mixture is blended for 240 minutes at which time the carbon dioxide is slowly removed from the vessel. The temperature of the vessel is maintained at 25° C. during this interval. The recovered carbon dioxide is passed through a carbon filter and is then compressed for reuse. Once the pressure in the unit has been reduced to atmospheric pressure, the vessel is opened and the product is removed. The product can be diluted with water for use, can be diluted with a solvent and used as is, can be diluted with a solvent and added to water, can be diluted with inert powder and used or it can be used as is.

I is claimed:

1. A method for the preparation of a water-soluble or water-dispersible formulation comprising an intimate mixture of at least one biologically active ingredient and at least one excipient, said biologically active ingredient and said excipient being soluble in liquid carbon dioxide, which comprises solubilizing and mixing said active ingredient(s) and said excipient(s) in liquid carbon dioxide under a pressure sufficient to maintain said carbon dioxide in the liquid state, reducing said pressure to convert said carbon dioxide to the gaseous state and removing said gaseous carbon dioxide to provide an intimate mixture of said water-soluble, or water-dispersible formulation.

2. A method according to claim 1, wherein said active ingredient is a pharmaceutical.

3. A method according to claim 1, wherein said pharmaceutical is dimenhydrinate.

4. A method according to claim 1, wherein said active ingredient is an agricultural chemical.

5. A method according to claim 4, wherein the agricultural chemical is alachlor.

6. A method according to claim 4, wherein the agricultural chemical is trifluralin.

7. A method according to claim 4, wherein the agricultural chemical is dicamba.

8. A method according to claim 1, wherein the active ingredient is a pesticide.

9. A method according to claim 8, wherein the pesticide is permethrin.

10. A method according to claim 8, wherein the pesticide is chlorpyrifos.

11. A method according to claim 1, wherein the active ingredient is an animal health chemical.

12. A method according to claim 11, wherein the animal health chemical is famphur.

13. A method according to claim 1, wherein the excipient is a surface active agent.

14. A method according to claim 13, wherein the surface active agent is a non-ionic surface agent.

15. A method according to claim 13, wherein the surface active agent is a cationic surfactant.

16. A method according to claim 13, wherein the surface active agent is an anionic surfactant.

17. A method according to claim 1, wherein the carbon dioxide is maintained at a pressure of 500 to 3000 psi during said solubilizing and mixing.

18. A method according to claim 17, wherein the carbon dioxide is maintained at a temperature of −20° to 40° C.

19. A method according to claim 17, wherein the carbon dioxide is maintained at a pressure of 1000 to 2000 psi.

20. A method according to claim 17, wherein the carbon dioxide is maintained at a temperature of 20° to 40° C.

21. A product produced by the method of claim 1.

22. A product produced by the method of claim 13.

* * * * *